(12) United States Patent
Park et al.

(10) Patent No.: US 10,021,721 B2
(45) Date of Patent: Jul. 10, 2018

(54) TRANSMISSION CONTROL METHOD

(71) Applicant: NEWRACOM, INC., Irvine, CA (US)

(72) Inventors: Hyungu Park, Daejeon (KR); Yongjin Kwon, Daejeon (KR); Joonsoo Lee, Irvine, CA (US); Jeongchul Shin, Daejeon (KR)

(73) Assignee: NEWRACOM, INC., Lake Forest, CA (US)

( * ) Notice: Subject to any disclaimer, the term of this patent is extended or adjusted under 35 U.S.C. 154(b) by 54 days.

(21) Appl. No.: 15/007,104

(22) Filed: Jan. 26, 2016

(65) Prior Publication Data

US 2016/0227441 A1 Aug. 4, 2016

Related U.S. Application Data

(60) Provisional application No. 62/108,974, filed on Jan. 28, 2015.

(30) Foreign Application Priority Data

Jan. 22, 2016 (KR) ........................ 10-2016-0008044

(51) Int. Cl.
*H04W 4/00* (2018.01)
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC ..................... H04W 74/0816; H04W 84/12
See application file for complete search history.

(56) References Cited

U.S. PATENT DOCUMENTS

| 2013/0316660 | A1* | 11/2013 | Hsin | H04W 74/0808 |
|---|---|---|---|---|
| | | | | 455/73 |
| 2016/0050691 | A1* | 2/2016 | Jauh | H04W 74/0808 |
| | | | | 370/252 |
| 2016/0156438 | A1* | 6/2016 | Sun | H04L 5/0007 |
| | | | | 370/330 |
| 2016/0174079 | A1* | 6/2016 | Wang | H04W 16/14 |
| | | | | 455/454 |
| 2016/0338047 | A1* | 11/2016 | Seok | H04B 7/2643 |

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Minh-Trang Nguyen

(57) ABSTRACT

A transmission control method by a device belonging to a BSS is provided in a WLAN. The device receives a frame. When a transmission condition including a first condition that a BSS color of the frame indicates a neighbor BSS of the BSS is satisfied, the device attempts a transmission at a time between a detection time of the BSS color and an end time of the frame.

20 Claims, 20 Drawing Sheets

(56) References Cited

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

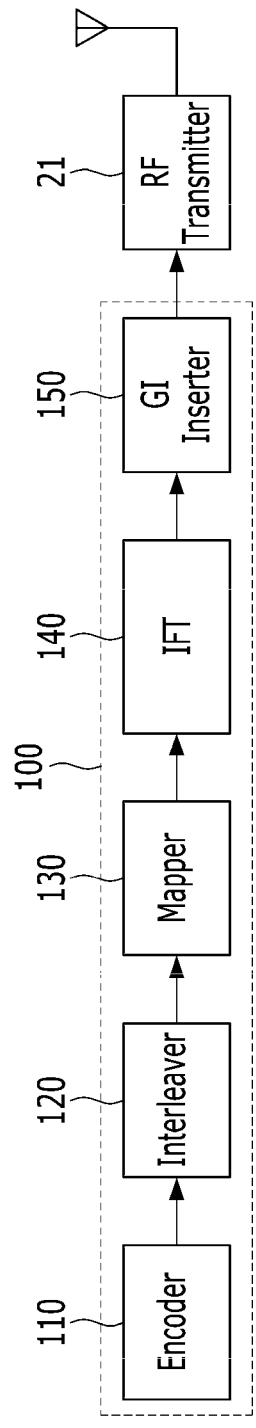
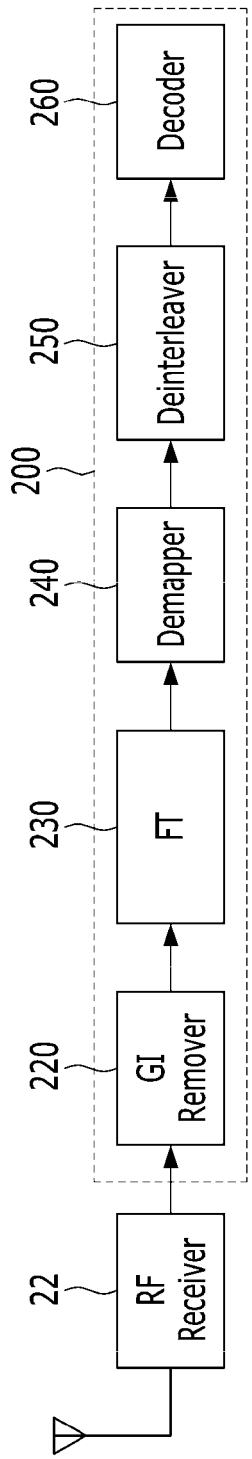

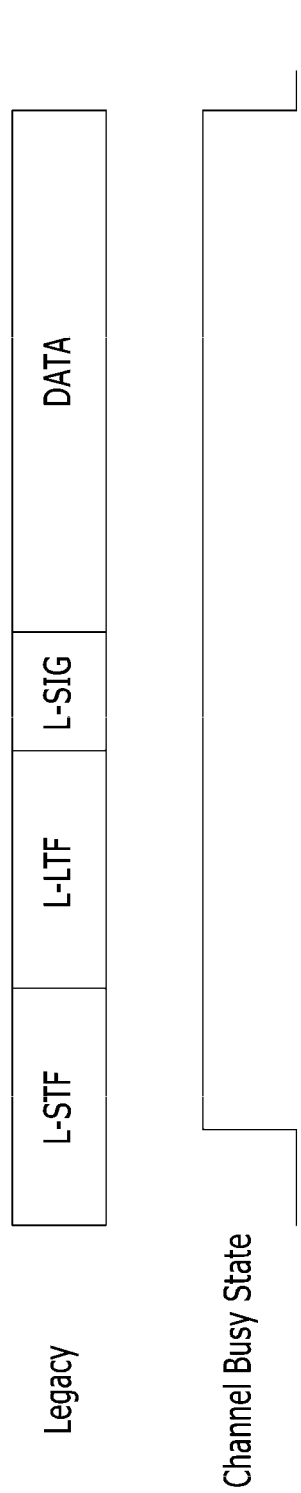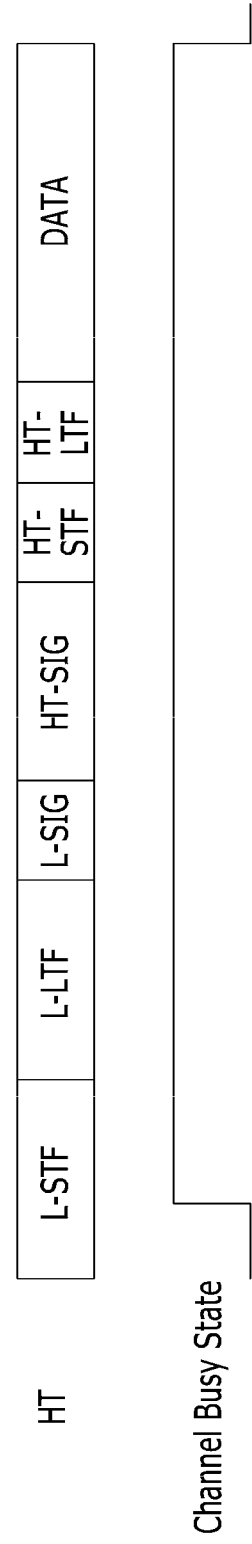

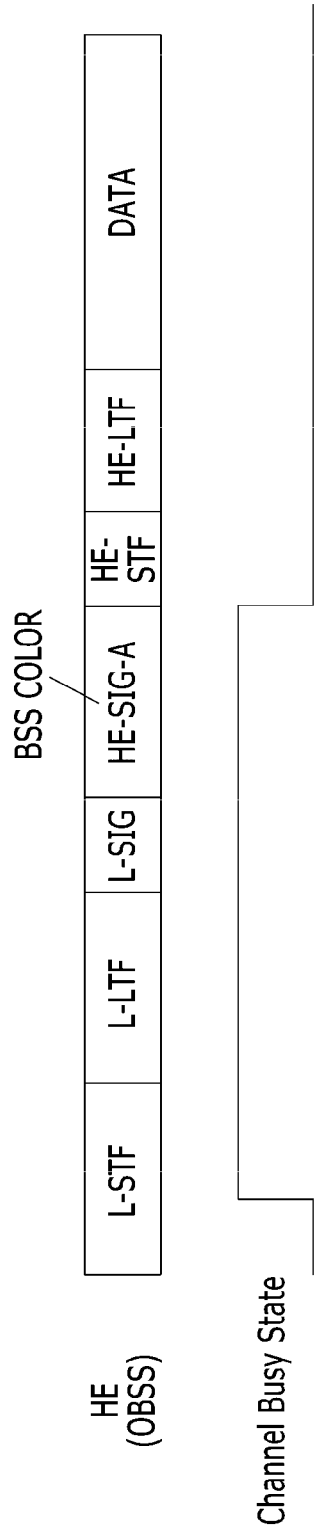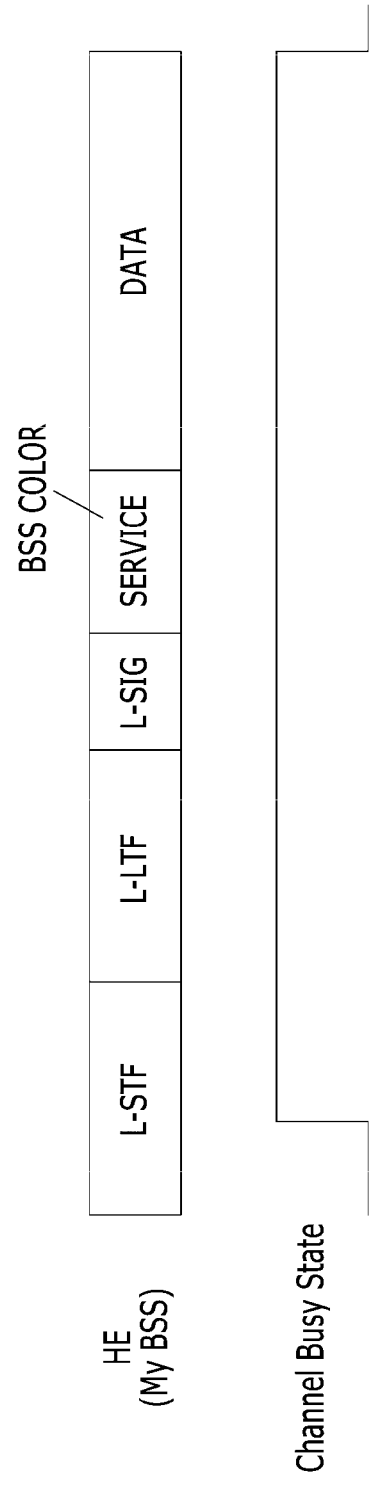

TRANSMISSION CONTROL METHOD

CROSS-REFERENCE TO RELATED APPLICATION

This application claims priority to and the benefit of U.S. Provisional Application No. 62/108,974, filed on Jan. 28, 2015 in the U.S. Patent and Trademark Office and priority to and the benefit of Korean Patent Application No. 10-2016-0008044, filed on Jan. 22, 2016 in the Korean Intellectual Property Office, the entire contents of which are incorporated herein by reference.

BACKGROUND (a) Field

The described technology relates to a transmission control method. More particularly, the described technology relates to a transmission control method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 5 GHz band and the IEEE standard 802.11b (IEEE Std 802.11b-1999) supporting 2.4 GHz band were published in 1999, and the IEEE standard 802.11g (IEEE Std 802.11g-2003) supporting 2.4 GHz band was published in 2003. These standards are called legacy. Subsequently, the IEEE standard 802.11n (IEEE Std 802.11n-2009) for enhancements for higher throughput (HT) was published in 2009, and the IEEE standard 802.11ac (IEEE 802.11ac-2013) for enhancements for very high throughput (VHT) was published in 2013. Hereinafter, a WLAN supporting the legacy standard is referred to a "legacy WLAN," a WLAN supporting the HT standard is referred to as an "HT WLAN," and a WLAN supporting the VHT standard is referred to as a "VHT WLAN."

In wireless communication networks such as the WLAN, each device occupies resources using a contention-based access scheme and transmits a signal. The WLAN device uses a carrier sense multiple access (CSMA) protocol to avoid collisions. In the CSMA protocol, the WLAN device detects energy on a channel and transmits the signal only when the channel is not being used. If the detected energy is above a clear channel assessment (CCA) threshold, the WLAN device deems that the channel is busy and performs a CCA operating for deferring the transmission attempt.

Recently, the IEEE 802.11ax task group has been developing a high efficiency (HE) WLAN for enhancing the system throughput in high density scenarios. In high density scenarios, a certain basic service set (BSS) may have a neighbor basis service BSS neighboring to it. In this, the WLAN device may lose its transmission opportunity during a transmission time of the neighbor BSS by performing the CCA operation according to a signal received from the neighbor BSS.

As such, since the WLAN may loss the transmission opportunity by the signal transmission of the neighbor BSS although a signal is not transmitted in its BSS, a channel cannot be efficiently used.

SUMMARY

An embodiment provides a transmission control method for efficiently using a channel.

According to an embodiment, a transmission control method by a device belonging to a BSS in a WLAN is provided. The method includes receiving a frame, and when a transmission condition including a first condition that a BSS color of the frame indicates a neighbor BSS of the BSS is satisfied, attempting a transmission at a time between a detection time of the BSS color and an end time of the frame.

The transmission condition may further include a second condition that a signal strength of the frame is higher than a predetermined CCA threshold when the BSS color indicates the neighbor BSS.

The method may further include setting a medium to a busy state from a detection time of the frame to the detection time of the BSS color.

The frame may include a field including the BSS color, and attempting the transmission may include performing backoff after the field.

Performing the backoff may include waiting during a contention window without duration of a predetermined interframe space (IFS) period after the field.

Performing the backoff may includes setting the contention window as a contention window according to the backoff minus a value corresponding to a time from a detection time of the frame to the detection time of the BSS color, and waiting during the set contention window.

The frame may include a field including the BSS color, receiving the frame may include setting a first primitive to a first state at a detection time of the frame, and attempting the transmission may include switching the first primitive from the first state to a second state after the field when the transmission condition is satisfied.

Receiving the frame further may include setting a second primitive to a first state at the detection time of the frame, and the method may further include switching the second primitive from the first state to a second state after the field.

Attempting the transmission may further include setting a backoff function to a backoff freeze state when the first primitive is in the first state and the second primitive is in the first state, and performing backoff when the first primitive is in the second state and the second primitive is in the second state. Performing the backoff may include waiting during a contention window according to the backoff without duration of a predetermined IFS period.

Attempting the transmission may include controlling backoff based on a state of a first primitive that is determined based on the transmission condition and a state of a second primitive that is determined based on whether a first field following a legacy signal field is detected in the frame.

Receiving the frame may include setting the first primitive to a first state and the second primitive to a first state at a detection time of the frame, and attempting the transmission may include maintaining the first primitive in the first state when the transmission condition is not satisfied and setting the second primitive to a second state when the first field is detected.

The transmission condition may further include a second condition that signal strength of the frame is higher than a predetermined CCA threshold when the BSS color indicates the neighbor BSS.

Attempting the transmission may include switching the first primitive from the first state to a second state when the transmission condition is satisfied and setting the second primitive to a second state when the first field is detected.

The second primitive may be maintained in a predetermined state when the frame is not a WLAN signal.

According to another embodiment, a transmission control method by a device belonging to a BSS in a WLAN is provided. The method includes receiving a frame including a short training field, a long training field, a first signal field, and a second signal field following the first signal field, wherein the short training field, the long training field, and the first signal field support a legacy WLAN, and the second signal field includes a BSS color, setting a medium to a busy state when the short training field is detected in the frame, and switching the medium from the busy state to an idle state when a transmission condition including a first condition that the BSS color detected from the second signal field indicates a neighbor BSS of the BSS is satisfied.

The method may further include suspending backoff while the medium is in the busy state.

The method may further include waiting during a contention window according to backoff after a predetermined IFS period when the medium is switched to the idle state.

The method may further include attempting a transmission after the contention window.

The transmission condition may further include a second condition that a signal strength of the frame is higher than a predetermined CCA threshold when the BSS color indicates the neighbor BSS.

The method may further include setting the medium to an idle state in a case that the signal strength of the frame is lower than the predetermined CCA threshold when the BSS color indicates the neighbor BSS.

According yet another embodiment, a transmission control apparatus of a device belonging to a BSS in a WLAN is provided. The apparatus includes a processor and a transceiver. The transceiver receives a frame. When a transmission condition including a first condition that a BSS color of the frame indicates a neighbor BSS of the BSS is satisfied, the processor attempts a transmission at a time between a detection time of the BSS color and an end time of the frame.

According to further embodiment, a transmission control apparatus of a device belonging to a BSS in a WLAN is provided. The apparatus includes a processor and a transceiver. The transceiver receives a frame including a short training field, a long training field, a first signal field, and a second signal field following the first signal field, wherein the short training field, the long training field, and the first signal field support a legacy WLAN, and the second signal field includes a BSS color. The processor sets a medium to a busy state when the short training field is detected in the frame, and switches the medium from the busy state to an idle state when a transmission condition including a first condition that the BSS color detected from the second signal field indicates a neighbor BSS of the BSS is satisfied.

BRIEF DESCRIPTION OF THE DRAWINGS

FIG. 2 is a schematic block diagram of a transmitting signal processor in an embodiment suitable for use in a WLAN.

FIG. 3 is a schematic block diagram of a receiving signal processing unit in an embodiment suitable for use in the WLAN.

FIG. 6 shows a transmission control method in a legacy WLAN.

FIG. 7 shows a transmission control method in an HT WLAN

FIG. 10 shows a transmission control method in a case that a device receives a frame from a neighbor BSS in a wireless communication network according to an embodiment.

FIG. 11 shows a transmission control method in a case that a device receives a frame from its BSS in a wireless communication network according to another embodiment.

DETAILED DESCRIPTION OF THE EMBODIMENTS

Figure 1:
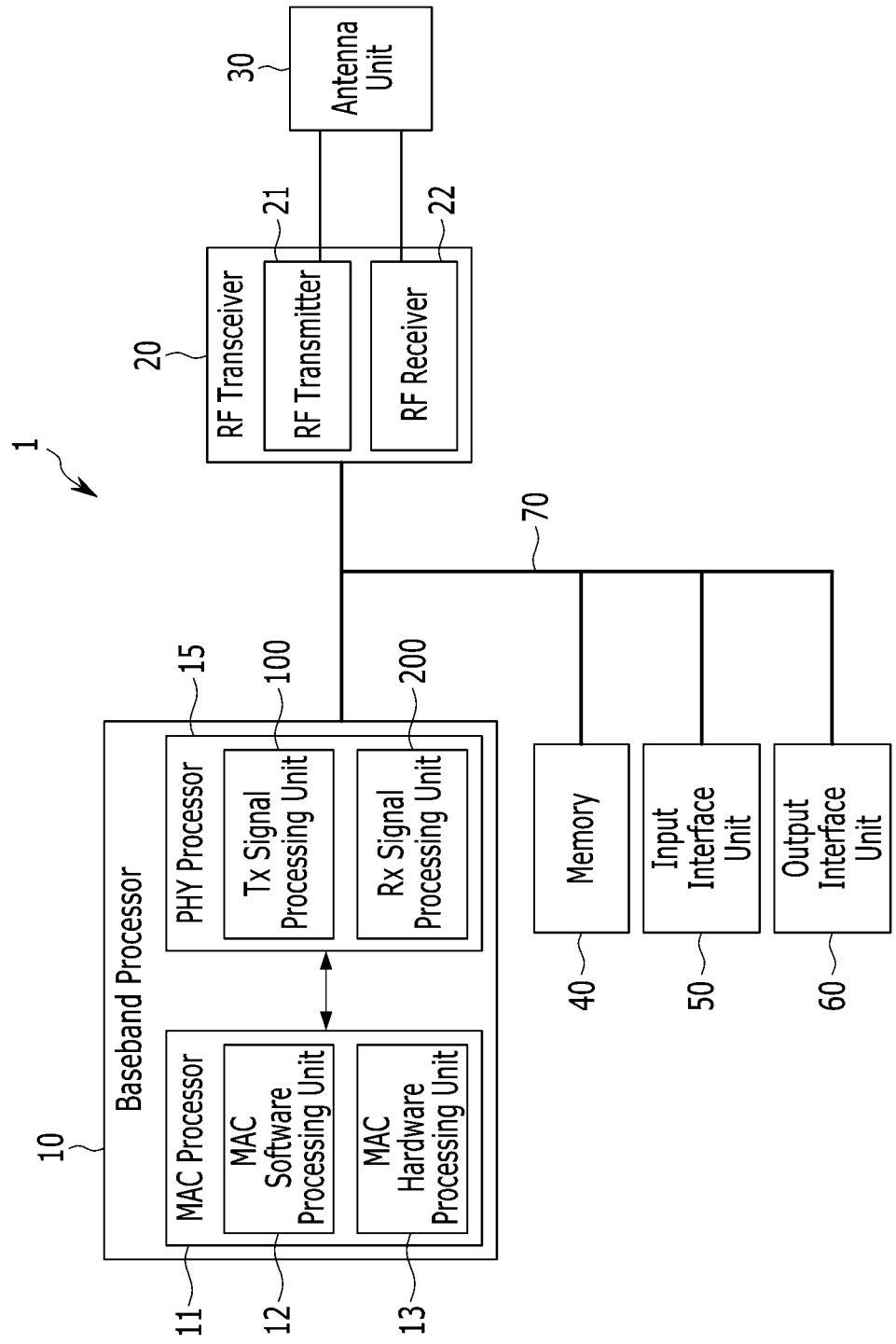
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60 and a bus 70.

The baseband processor 10 performs baseband signal processing and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer and the MAC hardware processing unit 13 may implement remaining functions of the MAC layer as hardware (hereinafter referred to "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50 and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140 and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250 and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
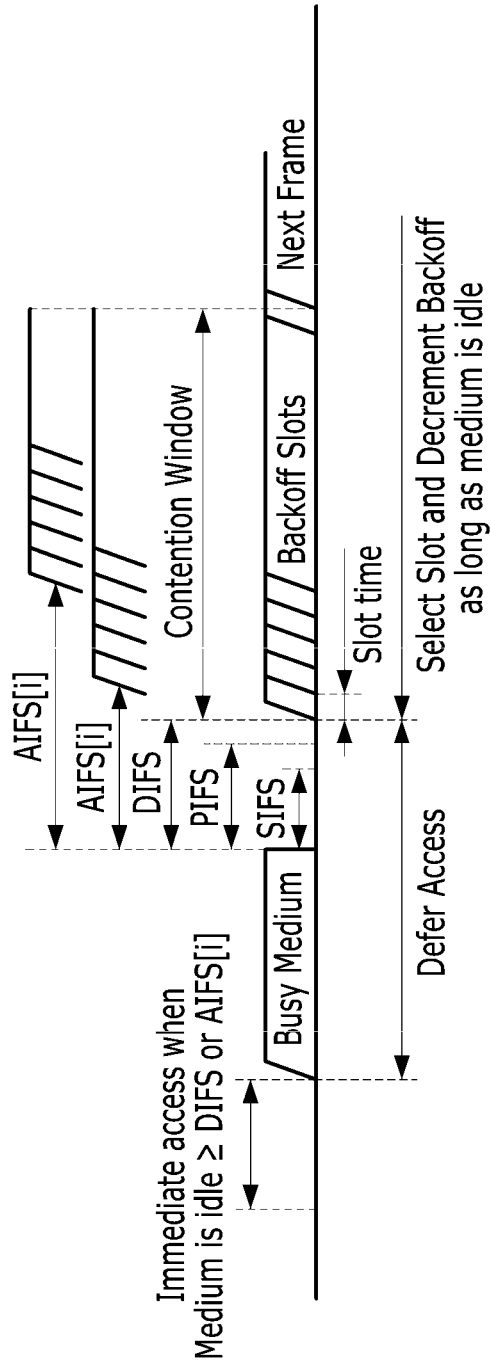
FIG. 4 shows Inter-Frame Space (IFS) relationships

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame and an authentication request/response frame. The control frame is used for controlling access to the medium. Subtype frames of the control frame include a request to send (RTS) frame, a clear to send (CTS) frame and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
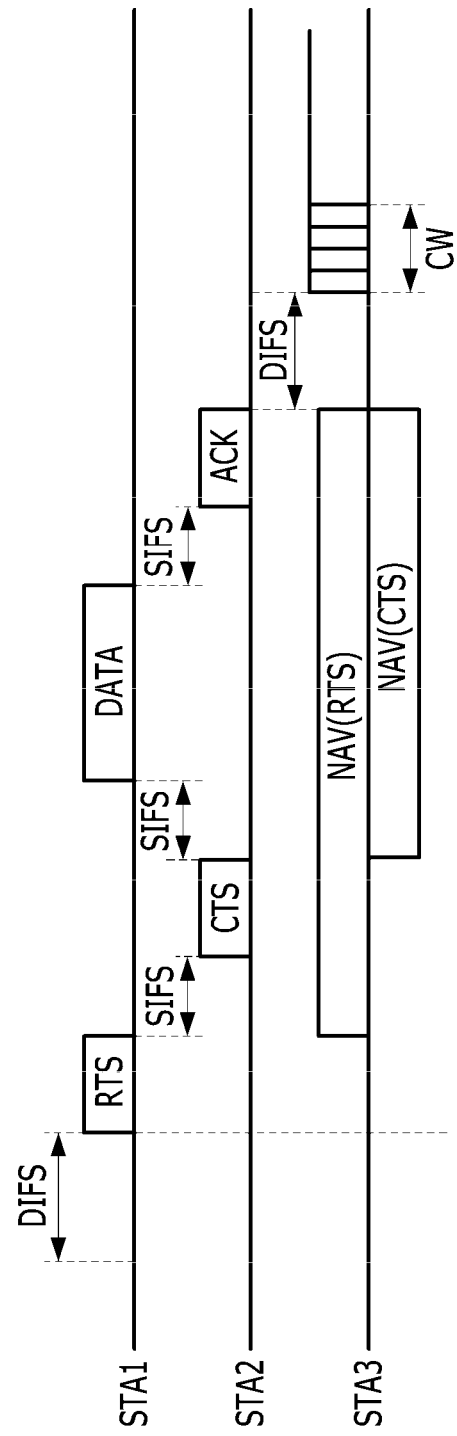
FIG. 5 is a schematic diagram showing a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Now, a transmission control method in a wireless communication network according to an embodiment is described with reference to the drawings.

First, transmission control methods in previous version WLANs are described with reference to FIG. 6, FIG. 7, and FIG. 8.

Figure 8:
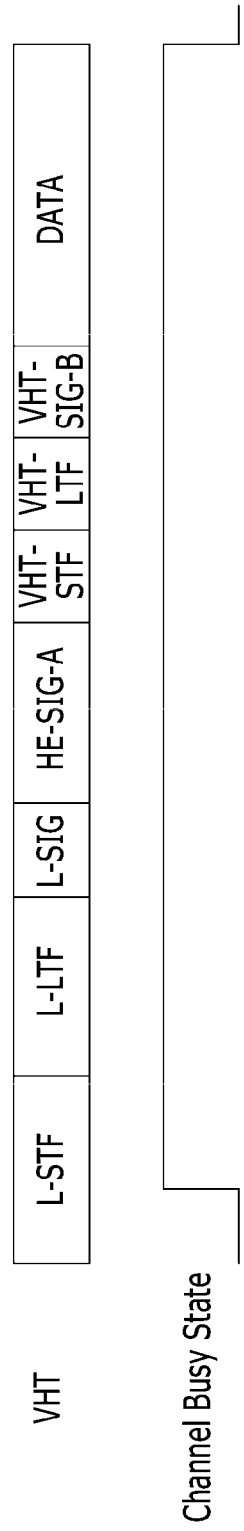
FIG. 8 shows a transmission control method in a VHT WLAN.

FIG. 6 shows a transmission control method in a legacy WLAN, FIG. 7 shows a transmission control method in an HT WLAN, and FIG. 8 shows a transmission control method in a VHT WLAN.

Referring to FIG. 6, a frame in the legacy WLAN (hereinafter referred to as a "legacy format frame") includes a legacy short training field (L-STF), a legacy long training field (L-LTF), a legacy signal field (L-SIG), and a legacy data field. The L-STF may be used for automatic gain control and signal detection, and the L-LTF may be used for channel estimation. The data field includes data to be transmitted, and the L-SIG may indicate a length of the data to be transmitted by the data field and a data rate used for transmitting the data.

Referring to FIG. 7, a frame in the HT WLAN (hereinafter referred to as an "HT format frame") includes a legacy preamble part and an HT part. Such an HT format frame may be an HT-mixed frame. The legacy preamble part includes a legacy short training field (L-STF), a legacy long training field (L-LTF), and a legacy signal field (L-SIG). The HT part includes an HT signal field (HT-SIG), an HT short training field (HT-STF), an HT long training field (HT-LTF), and a data field. The L-SIG indicates a length from the HT-SIG to the data field, and the HT-SIG carries information necessary for interpreting the HT format frame. The HT-STF may be used for automatic gain control of the HT part, and the HT-LTF may be used for channel estimation of the HT part. A single HT-LTF is shown in FIG. 7, but a plurality of HT-LTFs may be repeated.

Referring to FIG. 8, a frame in the VHT WLAN (hereinafter referred to as a "VHT format frame") includes a legacy preamble part and a VHT part. The legacy preamble part includes a legacy short training field (L-STF), a legacy long training field (L-LTF), and a legacy signal field (L-SIG). The VHT part includes a VHT signal field (VHT-SIG-A), a VHT short training field (VHT-STF), a VHT long training field (VHT-LTF), an additional VHT signal field (VHT-SIG-B), and a data field. The L-SIG indicates a length from the VHT-SIG-A to the data field, and the VHT-SIG-A and the VHT-SIG-B carry information necessary for interpreting the VHT format frame. The VHT-STF may be used for automatic gain control of the VHT part, and the VHT-LTF may be used for channel estimation of the VHT part. A single VHT-LTF is shown in FIG. 8, but a plurality of VHT-LTFs may be repeated.

Referring to FIG. 6 to FIG. 8 again, upon receiving a frame, a PHY of a device detects whether this frame is a valid orthogonal frequency division multiplexing (OFDM) signal while receiving an L-STF of the frame. The L-STF includes two OFDM symbols, and the PHY determines a validity of the signal within one symbol duration after the reception begins. In an example where a frame is received in a 20 MHz band, a PHY of a previous version WLAN device transfers a primitive notifying that a CCA is in use within 4 μs that is one symbol duration of an OFDM signal when receiving the valid OFDM signal having the strength having −82 dBm or more. This primitive is set to a busy state at signal detection in order to indicate that a channel is in use when the signal is detected, and is maintained as the busy state until an end time of a frame. The device may recognize the end time of the frame through the L-SIG.

In the WLAN, a CCA function in the PHY is provided as a logical function that determines a current state of use of the channel (i.e., wireless medium). A PHY-CCA.indication primitive for indicating a state of the CCA function in the PHY may be used for indicating the current state of the channel.

As such, the previous version WLAN device may not attempt to access the channel by setting the PHY-CCA.indication primitive to the busy state during a frame transmission time of a neighbor BSS even if receiving a frame from the neighbor BSS. Accordingly, since the device does not use the channel during this time, the network throughput can be deteriorated.

Figure 9:
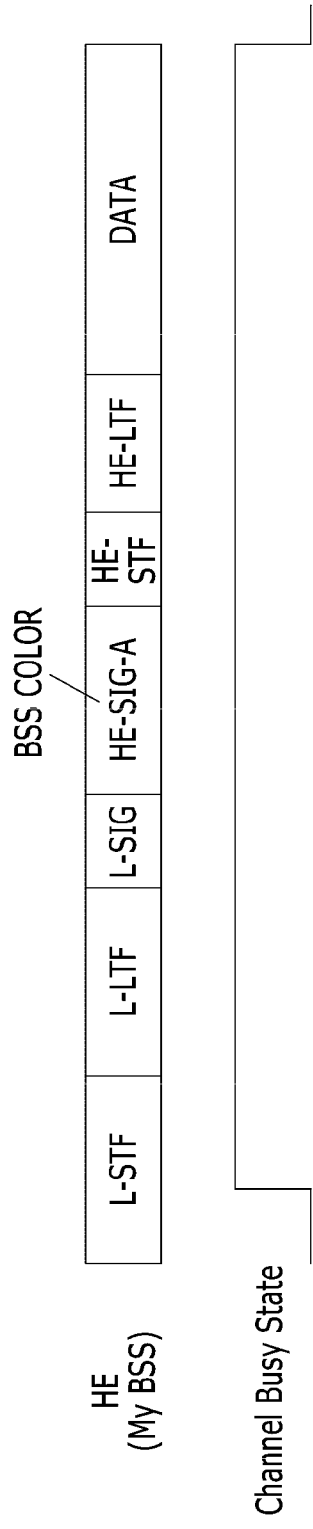
FIG. 9 shows a transmission control method in a case that a device receives a frame from its BSS in a wireless communication network according to an embodiment.

FIG. 9 shows a transmission control method in a case that a device receives a frame from its BSS in a wireless communication network according to an embodiment, and FIG. 10 shows a transmission control method in a case that a device receives a frame from a neighbor BSS in a wireless communication network according to an embodiment.

Referring to FIG. 9 and FIG. 10, a frame according to an embodiment (hereinafter referred to as a "HE frame") include a legacy preamble part and a part supporting a wireless communication network according to an embodiment, for example a HE part. Hereinafter, such a HE frame is referred to as a HE format frame.

The legacy preamble part is provided for compatibility with the previous version WLAN device, and includes a legacy short training field (L-STF), a legacy long training field (L-LTF), and a legacy signal field (L-SIG). The L-STF may be used for signal detection and automatic gain control and the L-LTF may be used for channel estimation. The L-SIG may include signaling information such as length information indicating a length of an entire frame.

The HE part includes a HE preamble and a data field. The data field includes data to be transmitted. The HE preamble includes a HE signal field (HE-SIG-A), a HE short training field (HE-STF), and a HE long training field (HE-LTF).

The HE-SIG-A follows the L-SIG. The HE preamble may further include an additional HE signal field (HE-SIG-B) (not shown) between the HE-SIG-A and the HE-STF. The HE-SIG-A and HE-SIG-B carry signaling information for the HE format frame. The length information of the L-SIG and the signaling information of the HE-SIG-A and HE-SIG-B may be decoded based on the channel information estimated by the L-LTF. The HE-STF may be used for automatic gain control of the HE part. The HE-LTF follows the HE-STF and may be used for channel estimation of the HE part. The HE-LTF may include a plurality of HE-LTFs.

The HE-SIG-A may carry a BSS color as the signaling information. The BSS color is an identifier (ID) for distinguishing a BSS to which the HE device belongs and a neighbor BSS and may have for example 6 bits. For example, when eight BSSs are adjacent, the eight BSSs may be allocated 0, 1, 2, 3, 4, 5, 6, and 7 as the BSS colors, respectively. Then, the neighboring BSSs can identify them using the BSS colors, and the HE device may easily determine whether the received frame comes from its BSS or comes from the neighbor BSS.

When a device (hereinafter referred to as a "HE device") supporting a wireless communication network according to an embodiment (for example, a HE WLAN) receives a frame, the HE device sets a state of the channel to a busy state indicating that the channel is in use. Subsequently, the HE device determines whether the received frame is a frame transmitted from its BSS or a frame transmitted from a neighbor BSS, based on a BSS color of a HE-SIG-A. Such a neighbor BSS may be an overlapping basic service set (OBSS) operating on the same channel as a BSS attempting to transmit a frame and within (either partly or wholly) its basic service area (BSA). Hereinafter, the neighbor BSS is described as an "OBSS."

As shown in FIG. 9, if the received frame is the frame transmitted from its BSS (My BSS), the HE device maintain the busy state until an end time of the frame. If the received frame is the frame transmitted from the OBSS, the HE device switches the state of the channel from the busy state to an idle state after the HE-SIG-A, as shown in FIG. 10.

In one embodiment, the HE device may switch the state of the channel from the busy state to the idle state at a time between a detection time of the HE-SIG-A and the end time of the frame. In another embodiment, the HE device may switch the state of the channel from the busy state to the idle state immediately after the HE-SIG-A. In yet another embodiment, the HE device may switch the state of the channel from the busy state to the idle state after a predetermined time elapses from the HE-SIG-A.

In some embodiments, upon detecting a valid signal in the L-STF, the PHY of the HE device transfers a primitive, for example a PHY-CCA.indication primitive, to a local MAC entity after setting a current state of the primitive to a busy state. Subsequently, the PHY of the HE device detects the BSS color by decoding the HE-SIG-A on a predefined position. The BSS color detection can be performed when the HE-SIG-A has been completely decoded or when the BSS color part of the HE-SIG-A has been decoded. When the BSS color has a value indicating its BSS, the HE device maintains the busy state of the PHY-CCA.indication primitive until the end time of the frame. The PHY of the HE device may maintain the busy state of the primitive when strength of the received signal is higher than a predetermined threshold, or may not maintain the busy state when strength of the received signal is lower than the threshold. Further, the PHY of the HE device may recognize the end time of the frame through the L-SIG. When the BSS color has a value indicating the OBSS that is not its BSS, the PHY of the HE device switches the current state of the PHY-CCA.indication primitive from the busy state to the idle state. The MAC entity may determine that the channel is in an idle state because the PHY-CCA.indication primitive is in the idle state.

As such, the HE device, upon receiving the frame from the OBSS, can access the channel after the HE-SIG-A such that the network throughput can be improved.

Figure 12:
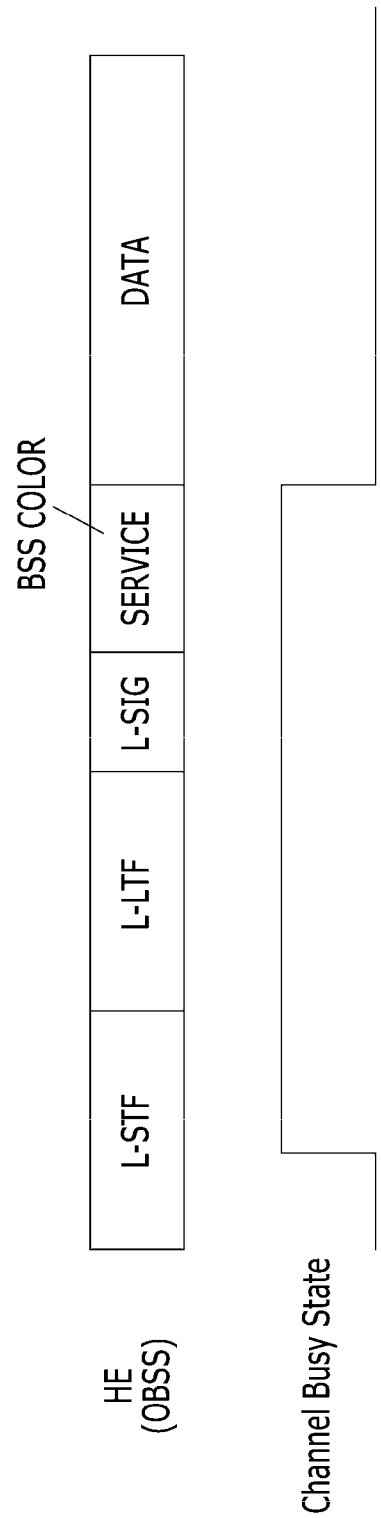
FIG. 12 shows a transmission control method in a case that a device receives a frame from a neighbor BSS in a wireless communication network according to another embodiment.
Figure 13:
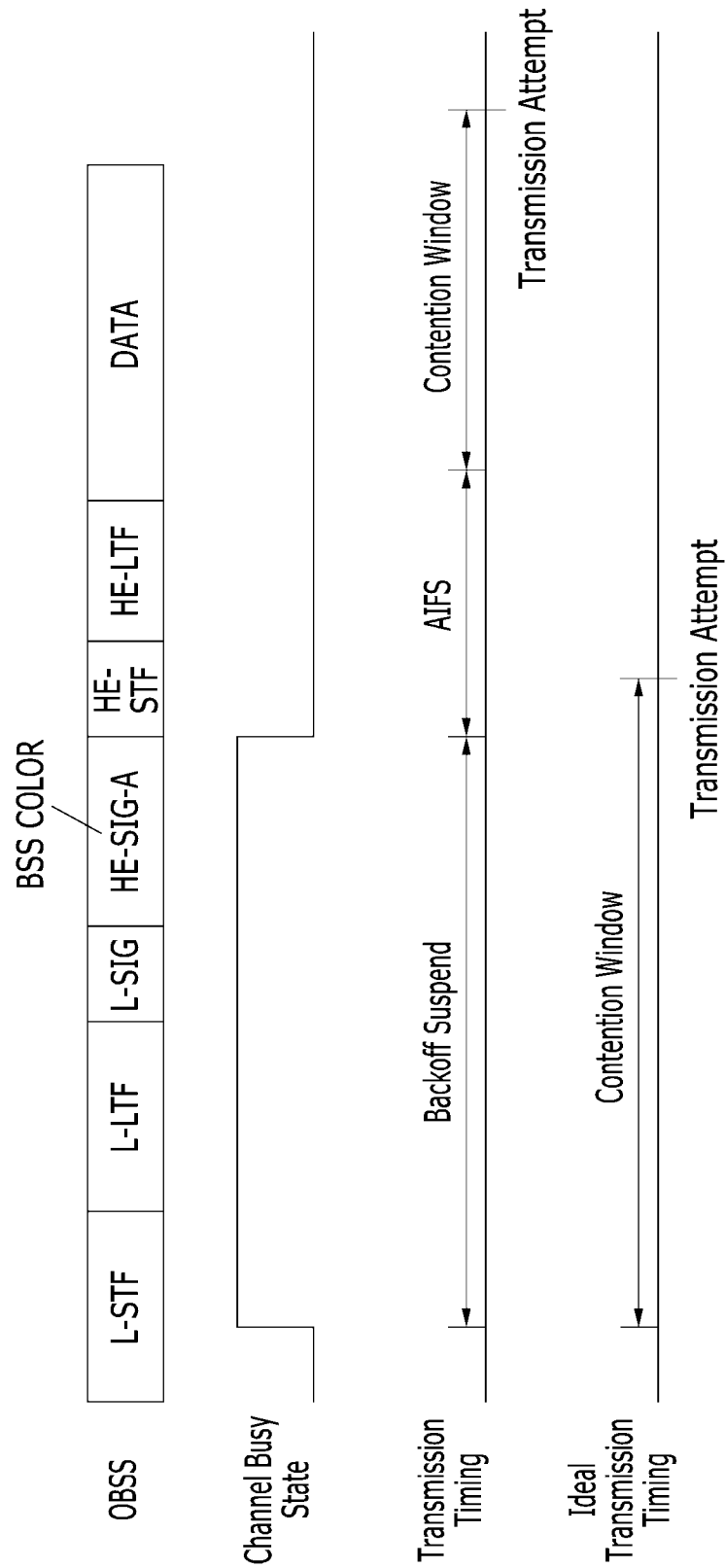
FIG. 13 is a drawing explaining a transmission timing difference with ideal transmission time in a wireless communication network according to an embodiment.

FIG. 11 shows a transmission control method in a case that a device receives a frame from its BSS in a wireless communication network according to another embodiment, and FIG. 12 shows a transmission control method in a case that a device receives a frame from a neighbor BSS in a wireless communication network according to another embodiment.

Referring to FIG. 11 and FIG. 12, according to another embodiment, a HE device may transmit a HE frame having a legacy format. The HE frame having the legacy format includes a legacy preamble and a data field. The legacy preamble includes a legacy short training field (L-STF), a legacy training field (L-LTF), and a legacy signal field (L-SIG). The data field includes the service field and data bits. The data field may further tail bits (not shown) and pad bits (not shown).

The service field may correspond to the first 16 bits of the data field. The first 7 bits of the service field may be scrambler initialization bits. The scrambler initialization bits may be used to synchronize a descrambler and may be set to zero to enable estimation of an initial state of a scrambler in a receiver. In the previous version WLAN, the remaining 9 bits are reserved and also set to zero.

A length 127 frame synchronization scrambler that uses a generator polynomial $G(D)=D^7+D^4+1$ may be used. The generator polynomial generates a scrambling sequence by repeatedly generating a 127-bit sequence from a 7-bit scrambler seed. Accordingly, the scrambler seed is one-to-one mapped to the first 7 bits of the scrambling sequence. Since the scrambler initialization bits are set to "0000000," the first 7 bits of data that are outputted by scrambling the data field before being scrambled are equal to the first 7 bits of the scrambling sequence. Therefore, a receiving device can determine the first 7 bits of the data field in the received frame as the scrambler seed and generate the same scrambling sequence as a transmitting device such that it can descramble the data field.

A BSS color is carried through some bits of the service field. In one embodiment, some bits of the first 7 bits in the service field (i.e., the first 7 bits of the scrambling sequence) may carry the BSS color. In another embodiment, some bits of 9 bits that is reserved in the previous version WLAN may carry the BSS color. In yet another embodiment, some bits of the entire 16 bits in the service field may carry the BSS color.

When receiving a frame, the HE device sets a state of the channel to a busy state indicating that the channel is in use. In some embodiments, upon detecting a signal in an L-STF of a frame, a PHY of the HE device transfers a primitive, for example a PHY-CCA.indication primitive, to a local MAC entity after setting a current state of the primitive to a busy state.

Subsequently, the PHY of the HE device detects the BSS color on the service field of the data field and determines whether the received frame is a frame transmitted from its BSS (My BSS) or a frame transmitted from an OBSS, based on the BSS color. As shown in FIG. 11, if the received frame is the frame transmitted from its BSS (My BSS), the HE device maintain the busy state until an end time of the frame. If the received frame is the frame transmitted from the OBSS, the HE device switches the state of the channel from the busy state to an idle state after the service field, as shown in FIG. 12. In some embodiments, the PHY of the HE device switches the current state of the PHY-CCA.indication primitive from the busy state to the idle state.

In one embodiment, the HE device may switch the state of the channel from the busy state to the idle state at a time between a detection time of the BSS color and the end time of the frame. In another embodiment, the HE device may switch the state of the channel from the busy state to the idle state immediately after the service field. In yet another embodiment, the HE device may switch the state of the channel from the busy state to the idle state after a predetermined time elapses from the service field.

As such, when receiving the frame from the OBSS, the HE device can access the channel after the service field such that the network throughput can be improved.

On the other hand, when the current state of the channel becomes the idle state, a WLAN device can attempt channel access for transmission after performing backoff when a predetermined IFS period, for example an AIFS period or a DIFS period has elapsed. When the HE device determines that the received frame is the frame of the OBSS, a backoff function of the MAC layer is in a backoff suspend state in which a backoff procedure is suspended even if the PHY switches the PHY-CCA.indication primitive from the busy state to the idle state.

Accordingly, even if the current state of the channel is switched to the idle state, the HE device cannot immediately attempt access and can attempt the access after when an AIFS period or a DIFS period elapses and then a contention window according to backoff elapses.

A case that a channel access is attempted after the contention window since a signal is not detected in the L-STF is ideal transmission timing. Therefore, transmission timing may be delayed by a time (for example, about 54-103 us) corresponding a sum of a time (for example, about 20-24 us when the BSS color is detected by the HE-SIG-A) for detecting the BSS color plus a time (for example, about 37-79 us) for an IFS period (AIFS or DIFS period) compared with the ideal transmission timing.

Hereinafter, embodiments for reducing the delay time of the transmission timing are described with reference to FIG. 14 to FIG. 20.

Figure 14:
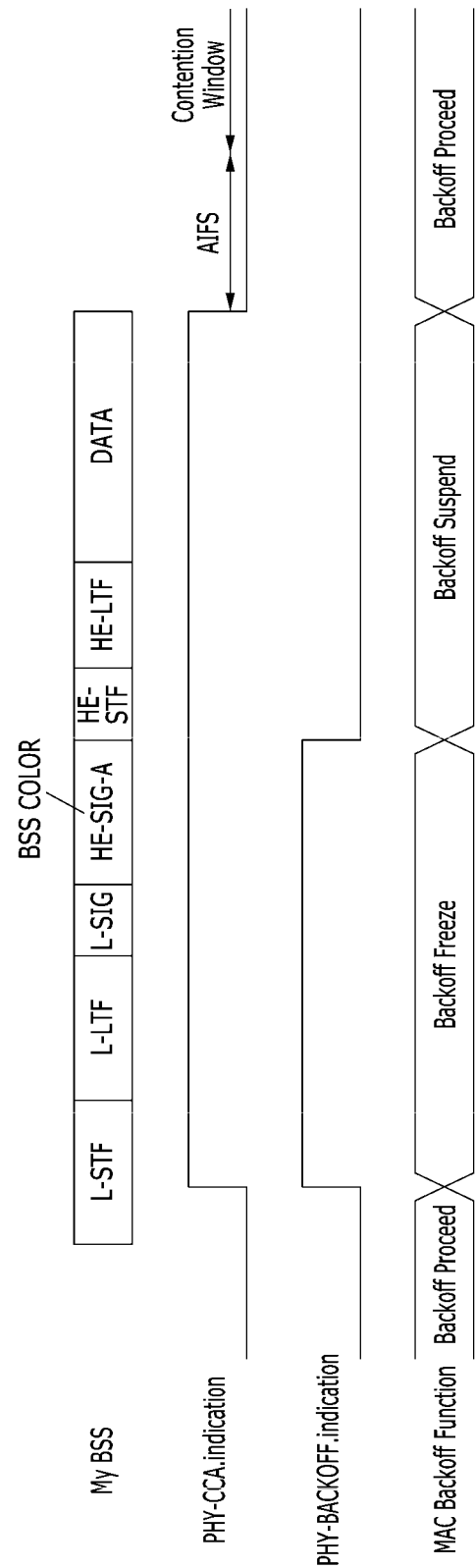
FIG. 14 shows a transmission control method in a case that a device receives a frame from its BSS in a wireless communication network according to yet another embodiment.
Figure 15:
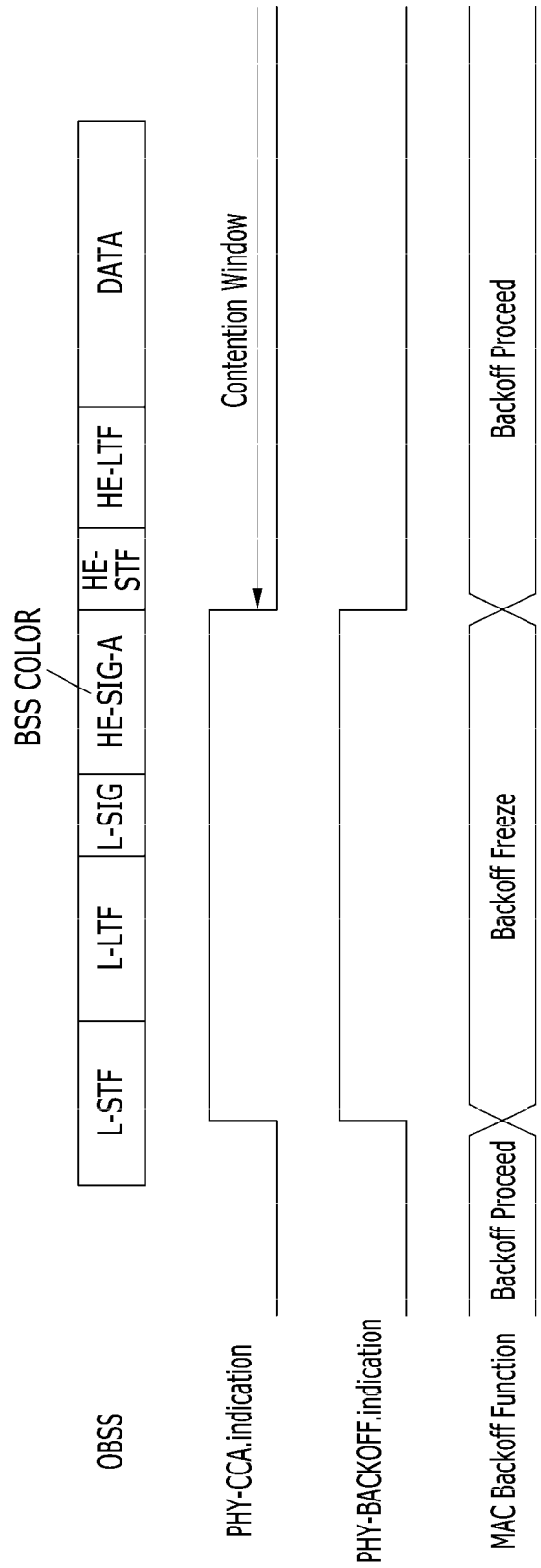
FIG. 15 and FIG. 16 each show a transmission control method in a case that a device receives a frame from a neighbor BSS in a wireless communication network according to yet another embodiment.
Figure 16:
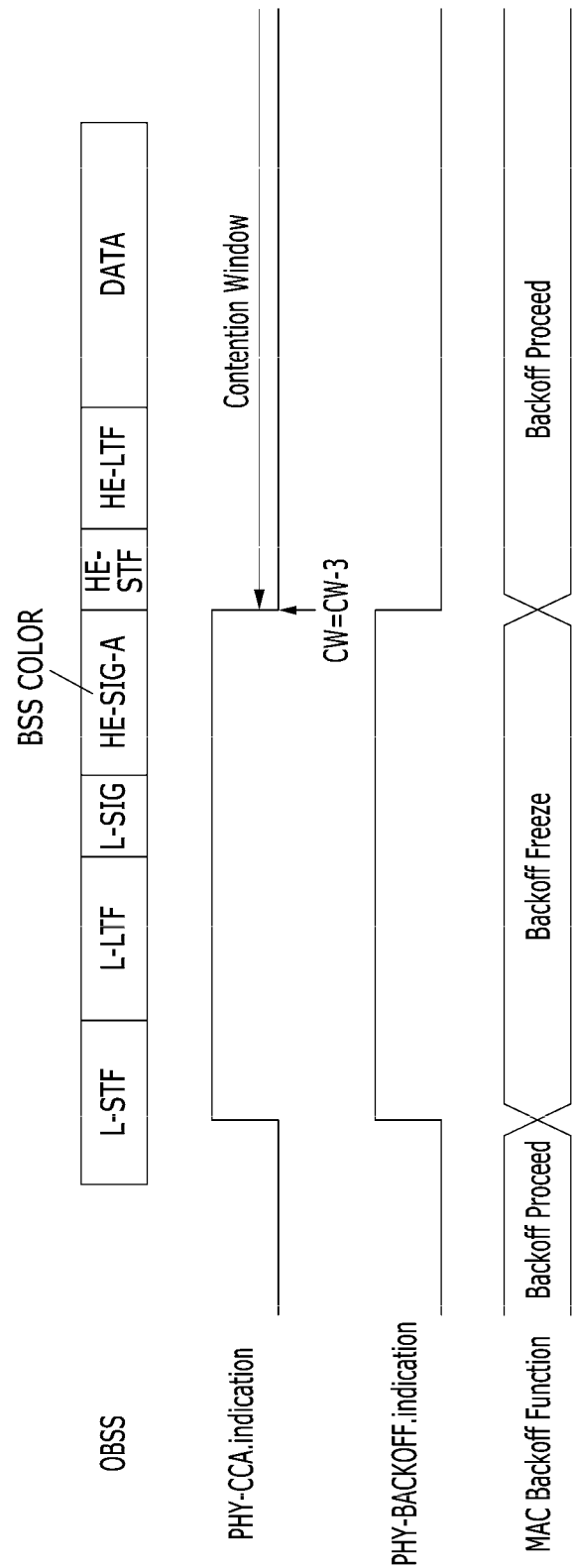
Figure 17:
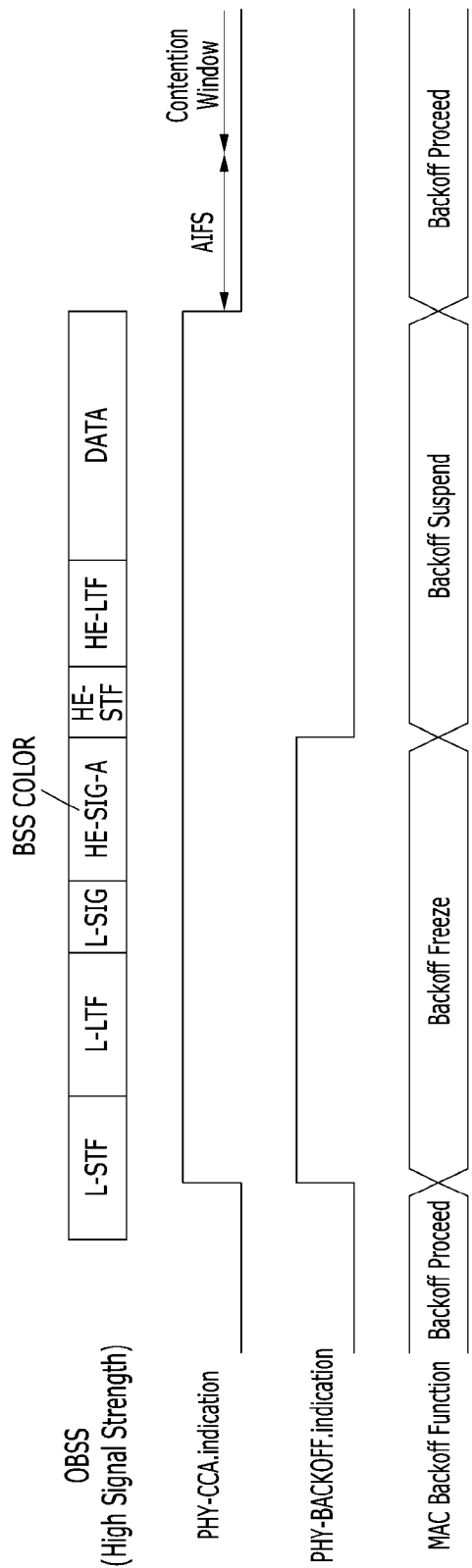
FIG. 17 shows a transmission control method in a case that a device receives a frame having strong signal strength from a neighbor BSS in a wireless communication network according to yet another embodiment.
Figure 18:
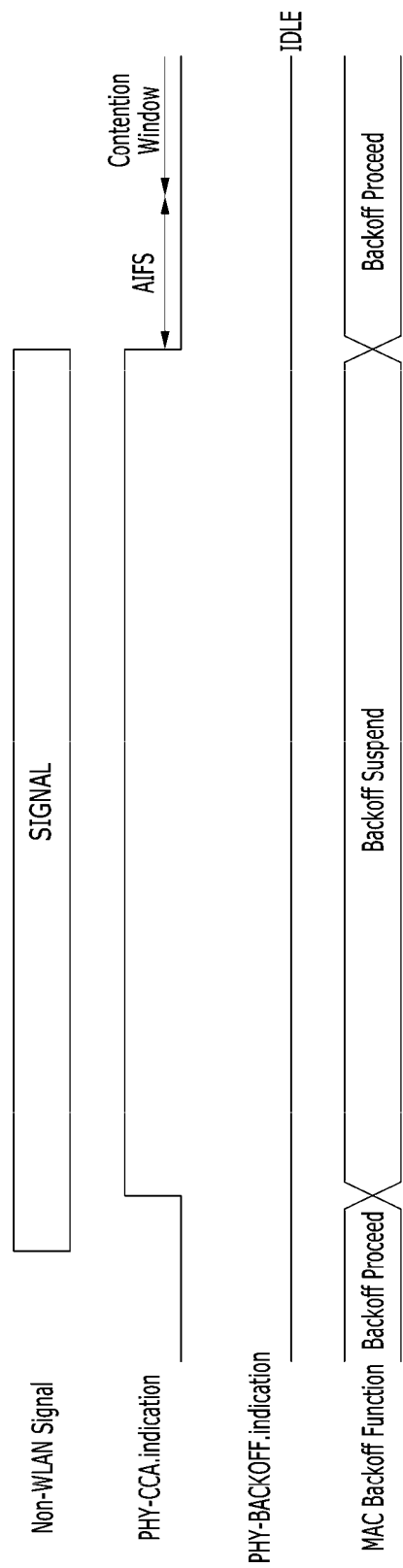
FIG. 18 shows a transmission control method in a case that a device receives a non-WLAN signal in a wireless communication network according to yet another embodiment.
Figure 19:
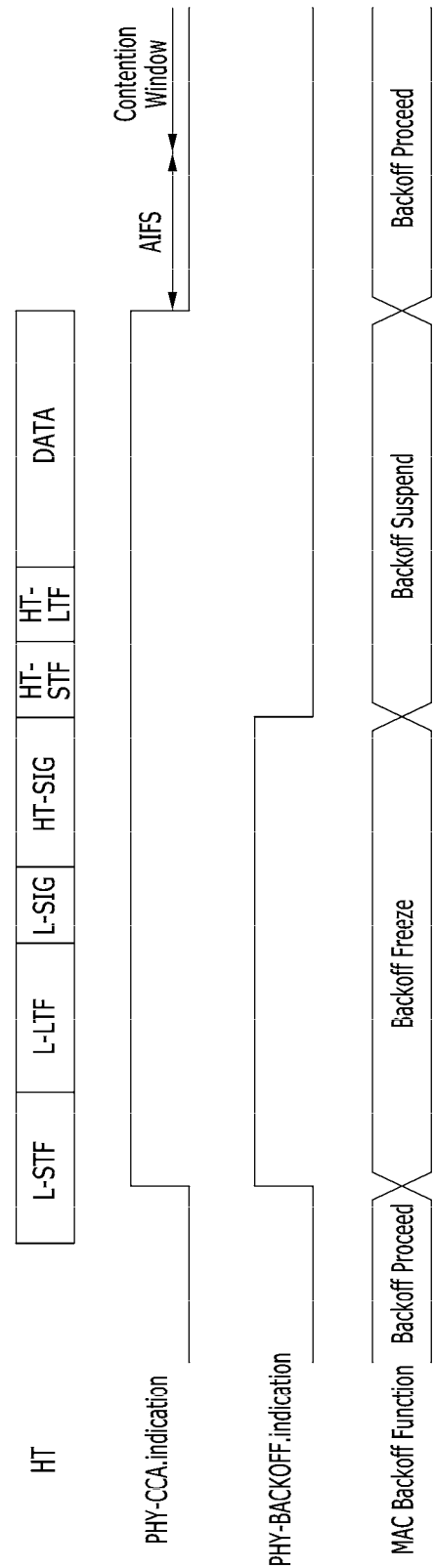
FIG. 19 shows a transmission control method in a case that a device receives an HT frame in a wireless communication network according to yet another embodiment.
Figure 20:
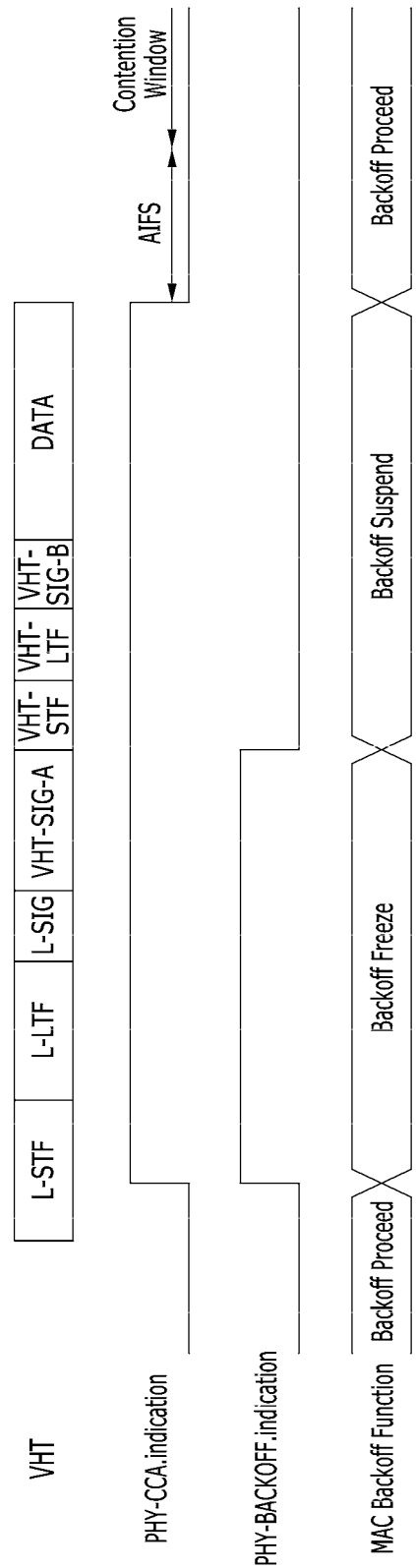
FIG. 20 shows a transmission control method in a case that a device receives a VHT frame in a wireless communication network according to yet another embodiment.

FIG. 14 shows a transmission control method in a case that a device receives a frame from its BSS in a wireless communication network according to yet another embodiment; FIG. 15 and FIG. 16 each show a transmission control method in a case that a device receives a frame from a neighbor BSS in a wireless communication network according to yet another embodiment; FIG. 17 shows a transmission control method in a case that a device receives a frame having strong signal strength from a neighbor BSS in a wireless communication network according to yet another embodiment, FIG. 18 shows a transmission control method in a case that a device receives a non-WLAN signal in a wireless communication network according to yet another embodiment, FIG. 19 shows a transmission control method in a case that a device receives an HT frame in a wireless communication network according to yet another embodiment, and FIG. 20 shows a transmission control method in a case that a device receives a VHT frame in a wireless communication network according to yet another embodiment.

Referring to FIG. 14 and FIG. 15, upon receiving a frame, a HE device sets a channel to a busy state and sets a backoff function of a MAC layer to a backoff freeze state. In some embodiments, the backoff freeze state is a state in which the backoff function is frozen, and is distinguished from a backoff suspend state in which a backoff procedure is suspended. Since the backoff function is frozen in the backoff freeze state, the backoff can be performed without a delay when the backoff proceeds by a release of the backoff freeze state. However, when the backoff proceeds by a release of the backoff suspend state, the backoff can be performed after duration of an IFS period (AIFS or DIFS period).

Subsequently, the HE device detects a BSS color from the received frame and determines whether the received frame is a frame transmitted from its BSS or a frame transmitted from an OBSS, based on the BSS color.

As shown in FIG. 14, when the received frame is the frame transmitted from its BSS, the HE device maintains the channel in the busy state until an end time of the frame. In addition, the HE device switches the backoff function of the MAC layer from the backoff freeze state to the backoff suspend state after detecting the BSS color. When the received frame ends, the HE device switches the current state of the channel to an idle state and releases the backoff suspend state. Accordingly, the HE device performs the backoff after a predetermined IFS period.

As shown in FIG. 15, when the received frame is the frame transmitted from the OBSS, the HE device switches the channel from the busy state to the idle state. Further, the HE device releases the backoff freeze state after detecting the BSS color and performs the backoff without duration of the IFS period. Accordingly, the HE device can perform the transmission by attempting the channel access after the backoff. That is, the HE device can perform the transmission at the same time as the OBSS while the OBSS is transmitting a frame.

In some embodiments, if a PHY of the HE device detects a signal in the L-STF, the PHY sets a current state of a PHY-CCA.indication primitive to a busy state and then transfers the PHY-CCA.indication primitive to a local MAC entity in order to set the state of the channel. The PHY sets a primitive indicating the backoff, for example a PHY-BACKOFF.indication primitive, to a predetermined value, for example a busy state, and then transfers the PHY-BACKOFF.indication primitive to the local MAC entity. In addition, the MAC layer sets the backoff function to the backoff freeze state.

Subsequently, the PHY of the HE device detects the BSS color by decoding the HE-SIG-A and sets the PHY-BACKOFF.indication primitive to another value, for example an idle value, after the detection time of the BSS color (i.e., the HE-SIG-A).

When the BSS color has a value indicating its BSS, the PHY of the HE device maintains the busy state of the PHY-CCA.indication primitive until the end time of the frame. Further, the MAC layer switches the backoff function to the backoff suspend state when the PHY-CCA.indication primitive is in the busy state and the PHY-BACKOFF.indication primitive is in the idle state. When the received frame ends, the PHY of the HE device switches the PHY-CCA.indication primitive to the idle state, and the backoff function of the MAC layer performs the backoff after the predetermined IFS period.

When the BSS color has a value indicating the OBSS, the PHY of the HE device switches the PHY-CCA.indication primitive to the idle state. Further, the MAC layer releases the backoff freeze state of the backoff function and performs the backoff when the PHY-CCA.indication primitive is in the idle state and the PHY-BACKOFF.indication primitive is in the idle state. Accordingly, the HE device can attempt a frame transmission before the received frame ends, by performing the backoff without the delay (i.e., the duration of the predetermined IFS period).

Referring to FIG. 16, in some embodiments, the HE device may treat a period of the backoff freeze state as a contention window when releasing the backoff freeze state and then performing the backoff by the BSS color indicating the OBSS. That is, since the HE device can be deemed to be in an idle state while the HE device is in the backoff freeze state, it can be treated that a part of the contention window elapses in the backoff freeze state when the backoff is performed.

In one embodiment, the HE device may measure a time of the backoff freeze state and subtract the measured time of the backoff freeze state from a contention window according to random backoff. In some embodiments, the time of the backoff freeze state may be measured as a slot time. When the HE-SIG-A includes the BSS color, the time of the backoff freeze state is a time from the L-STF to the HE-SIG-A and may be about three slot times. Accordingly, the HE device may decrement the contention window, starting from the calculated contention window minus the three slot times. Therefore, a time required for the backoff can be reduced.

Referring to FIG. 17, in some embodiments, the HE device maintains the busy state until the end time of the frame if signal strength of the received frame is higher than a CCA threshold even if the received frame is the frame transmitted from the OBSS. Further, the HE device switches the backoff function of the MAC layer from the backoff freeze state to the backoff suspend state after detecting the BSS color. When the received frame ends, the HE device switches the current state of the channel to an idle state and releases the backoff suspend state. Accordingly, the HE device performs the backoff after the IFS period.

As such, if the HE device starts a transmission when the signal strength of the received frame is higher than the CCA threshold, a frame transmitted by the HE device may collide with the frame from the OBSS. Therefore, the HE device may attempt the transmission after the received frame ends, like a frame received from its BSS.

In some embodiments, when detecting a signal in an L-STF, the PHY of the HE device sets a current state of a PHY-CCA.indication primitive to a busy state and then transfers the PHY-CCA.indication primitive to a local MAC entity. The PHY sets a primitive indicating the backoff, for example a PHY-BACKOFF.indication primitive, to a predetermined value, for example a busy state, and then transfers the PHY-BACKOFF.indication primitive to the local MAC entity. In addition, the MAC layer sets the backoff function to the backoff freeze state. When strength of the signal detected in the L-STF is higher than the CCA threshold, the PHY of the HE device sets the PHY-CCA.indication primitive to the busy state until an end time of the received frame.

Subsequently, the PHY of the HE device detects the BSS color by decoding the HE-SIG-A and sets the PHY-BACKOFF.indication primitive to another value, for example an idle value, after the detection time of the BSS color (i.e., the HE-SIG-A).

Accordingly, even if the BSS color indicates the OBSS, the MAC layer switches the backoff function to a backoff suspend state since the PHY-CCA.indication primitive is in the busy state and the PHY-BACKOFF.indication primitive is in the idle state after the detection time of the BSS color. When the received frame ends, the PHY of the HE device switches the PHY-CCA.indication primitive to the idle state, and the backoff function of the MAC layer can perform the backoff after a predetermined IFS period.

Referring to FIG. 18, in some embodiments, when the HE device determines that the received frame is not a WLAN signal and signal strength is higher than a CCA threshold, the HE device maintains a busy state until an end time of the frame. In one embodiment, since the HE device cannot recognize the end time of the frame when the received frame is not the WLAN signal, the HE device may identify the end time of the frame by detecting a signal at regular interval or randomly. When the received frame ends, the HE device switches a current state of a channel to an idle state and releases a backoff suspend state. Accordingly, the HE device performs the backoff after the IFS period.

In some embodiments, upon detecting a signal in an L-STF, the PHY of the HE device sets a current state of a PHY-CCA.indication primitive to a busy state and then transfers the PHY-CCA.indication primitive to a local MAC entity. If the detected signal is not the WLAN signal, the PHY of the HE device does not set a primitive indicating the backoff, for example a PHY-BACKOFF.indication primitive, to a predetermined value, for example a busy state. Accordingly, since the PHY-CCA.indication primitive is in the busy state and the PHY-BACKOFF.indication primitive is in the idle state, the MAC layer sets the backoff function to the backoff suspend state. When the received frame ends, the PHY of the HE device switches the PHY-CCA.indication primitive to the idle state, and the backoff function of the MAC layer can perform the backoff after the predetermined IFS period.

Referring to FIG. 19 and FIG. 20, in some embodiments, a frame received by the HE device may be not a HE frame (for example, a frame described with reference to FIG. 9, FIG. 10, FIG. 11, or FIG. 12). In this case, the HE device can identify that the frame is not the HE frame through a field following an L-SIG. For example, the HE device can identify that the frame is an HT format frame through an HT-SIG following the L-SIC when receiving the HT format frame, and the HE device can identify that the frame is a VHT format frame through a VHT-SIG-A following the L-SIC when receiving the VHT format frame.

In this case, the PHY of the HE device switches a PHY-BACKOFF.indication primitive to an idle state and transfers the PHY-BACKOFF.indication primitive to a local MAC entity, at a time detecting that the frame is not the HE frame, i.e., a time detecting that the frame is not the HE frame through the HT-SIG or the VHT-SIG-A. Accordingly, a backoff function of the MAC layer can perform like a previous version WLAN that does not use the PHY-BACKOFF.indication primitive.

Next, a transmission control method in a wireless communication network according to an embodiment is described with reference to FIG. 21 to FIG. 24.

Figure 21:
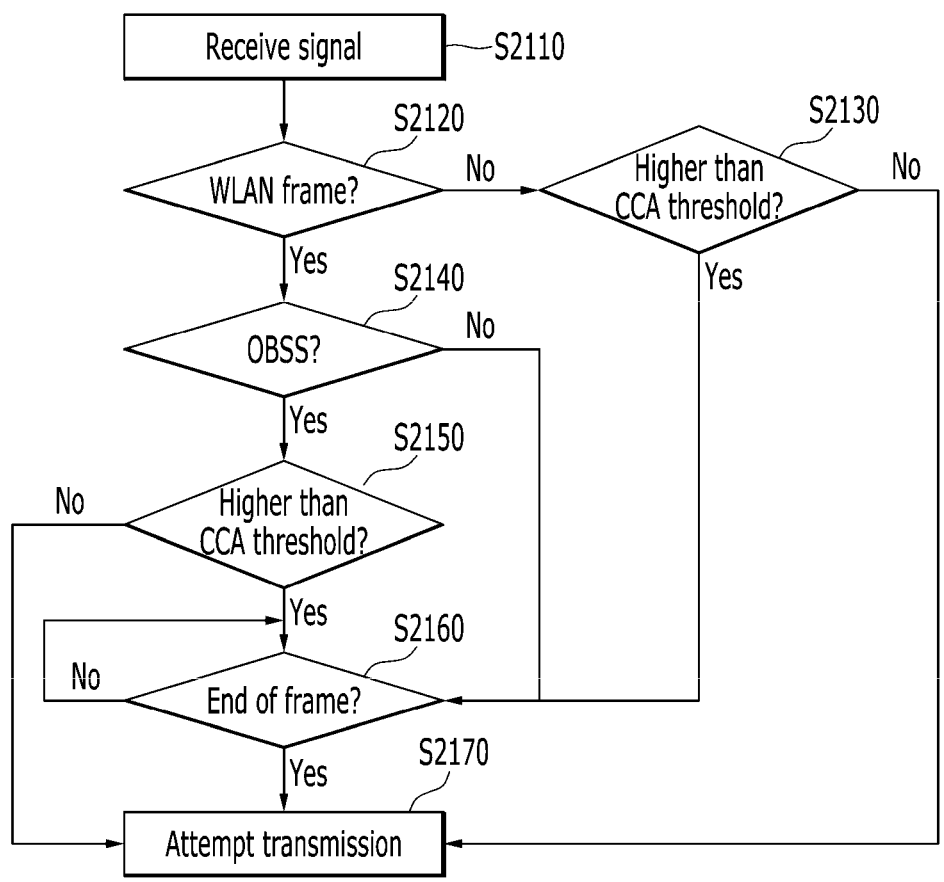
FIG. 21 is a flowchart showing a transmission control method in a wireless communication network according to an embodiment.
Figure 22:
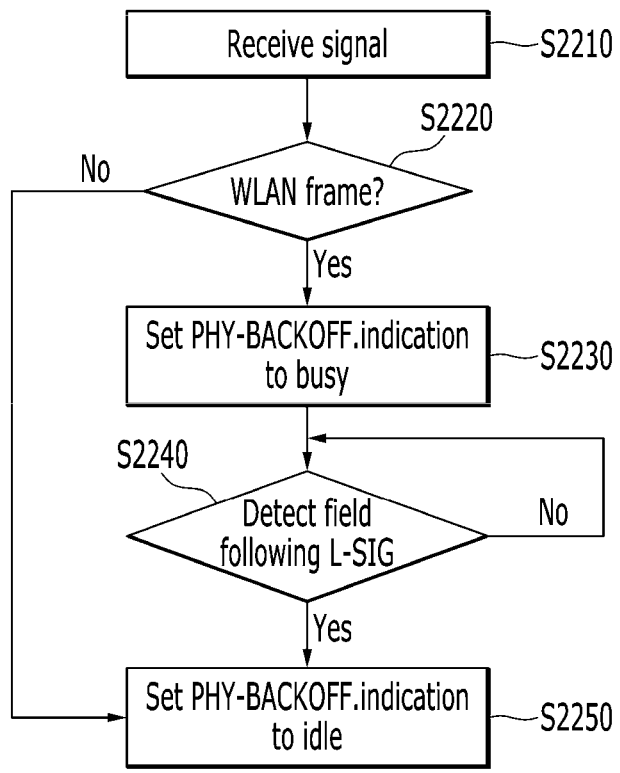
FIG. 22 is a flowchart showing a method for controlling a PHY-BACKOFF.indication primitive by a PHY in a wireless communication network according to an embodiment.
Figure 23:
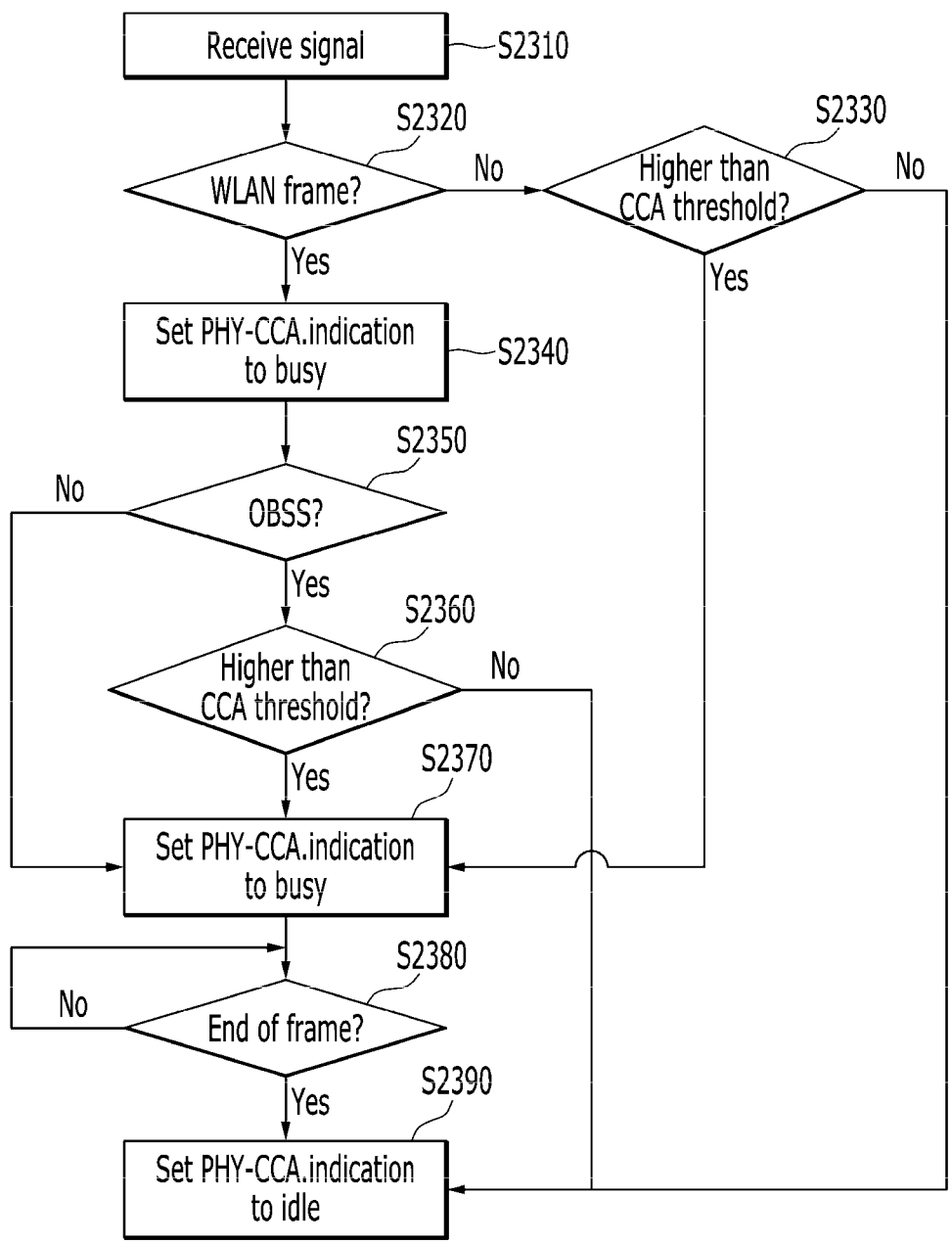
FIG. 23 is a flowchart showing a method for controlling a PHY-CCA.indication primitive by a PHY in a wireless communication network according to an embodiment.
Figure 24:
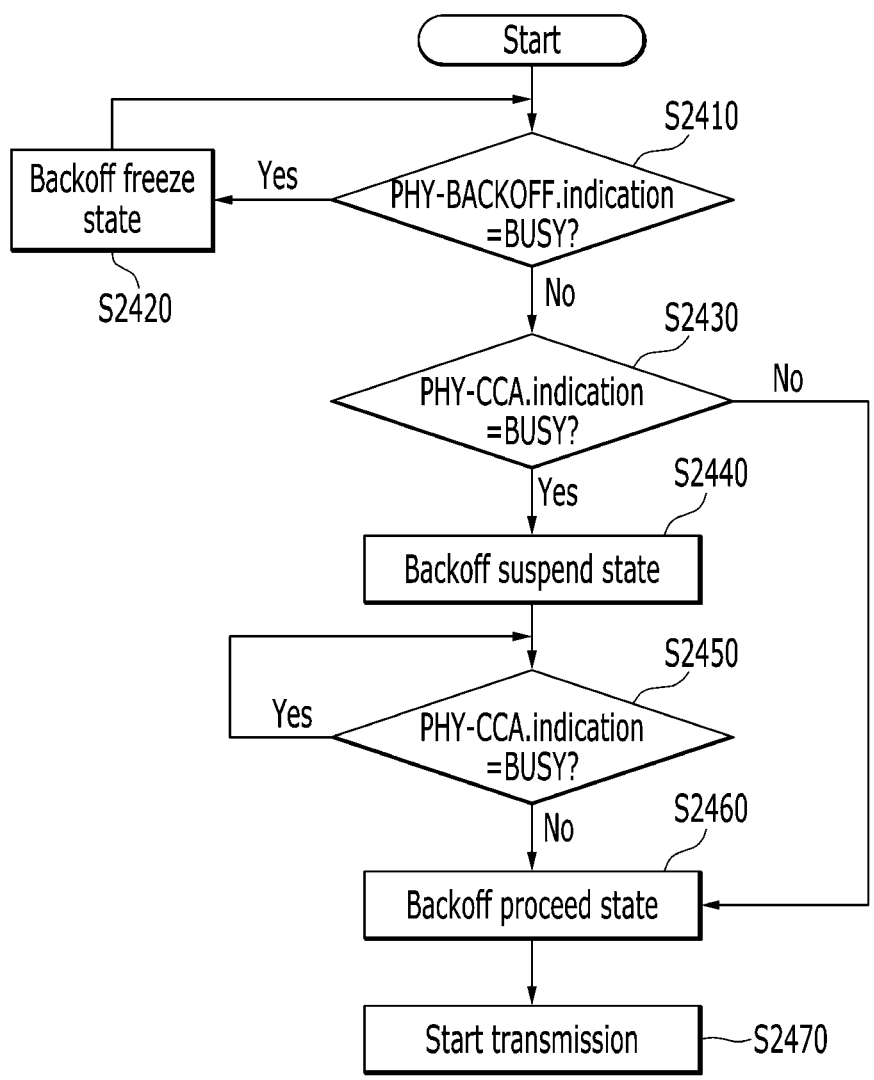
FIG. 24 is a flowchart showing a method for controlling backoff by a MAC layer in a wireless communication network according to an embodiment.

FIG. 21 is a flowchart showing a transmission control method in a wireless communication network according to an embodiment, FIG. 22 is a flowchart showing a method for controlling a PHY-BACKOFF.indication primitive by a PHY in a wireless communication network according to an embodiment, FIG. 23 is a flowchart showing a method for controlling a PHY-CCA.indication primitive by a PHY in a wireless communication network according to an embodiment, and FIG. 24 is a flowchart showing a method for controlling backoff by a MAC layer in a wireless communication network according to an embodiment.

Referring to FIG. 21, upon receiving a signal (S2110), a HE device determines whether the received signal is a WLAN frame (S2120). In some embodiments, the HE device may determine whether the received signal is the WLAN frame by determining whether an L-STF is detected in the received signal.

If the received signal is not the WLAN frame, the HE device determines whether strength of the received signal is higher than a CCA threshold (S2130). Since the received signal does not act interference when the strength of the received signal is lower than the CCA threshold, the HE device attempts a transmission (S2140). Since the received signal acts the interference when the strength of the received signal is higher than the CCA threshold, the HE device attempts the transmission (S2170) after the received signal ends (S2160).

If the received signal is the WLAN frame, the HE device determines whether the received signal is a frame transmitted from an OBSS (S2140). In some embodiments, the HE device may detect a BSS color from a HE-SIG-A and determine whether the received signal is the frame transmitted from the OBSS, based on the BSS color.

If the received signal is not the frame transmitted from the OBSS (i.e., the received signal is a WLAN frame transmitted from its BSS), the HE device waits without attempting the transmission until an end time of the frame. After the frame ends (S2160), the HE device performs backoff and then attempts the transmission (S2170).

If the received signal is the WLAN frame transmitted from the OBSS, the HE device determines whether the strength of the received signal is higher than a CCA threshold (S2150). In some embodiments, the HE device may set the CCA threshold used for determining the signal strength of the OBSS to be different from the CCA threshold used for determining the strength of the other signal. In one embodiment, since the frame transmitted from the OBSS is not the frame transmitted from its BSS, the HE device set the CCA threshold to be higher the CCA threshold used for determining the strength of the other signal.

If the signal strength of the frame received from the OBSS is higher than the CCA threshold, the HE device performs the backoff and then attempts the transmission (S2170) after the frame ends (2160). If the signal strength of the frame received from the OBSS is lower than the CCA threshold, the HE device attempts the transmission (S2170) after the detection time of the BSS color. In some embodiments, the HE device may attempt the transmission at a time between the detection time of the BSS color and the end time of the received frame. In one embodiment, the HE device may perform the backoff from the detection time of the BSS color. In another embodiment, when performing the backoff from the detection time of the BSS color, the HE device may reduce a value of a contention window by a value corresponding to a time during which the HE device waits until the detection time of the BSS color. In yet another embodiment, the time during which the HE device waits until the detection time of the BSS color may be a value corresponding to a time from a signal detection time at the L-STF to the detection time of the BSS color.

As such, according to an embodiment, the HE device can attempt the transmission without waiting until the end time of the received frame when the frame having the low strength is received from the OBSS.

Next, settings of primitives by a PHY or MAC layer of a HE device are described.

First, a method of setting a state of a primitive indicating backoff, for example a PHY-BACKOFF.indication primitive, by the PHY of the HE device is described with reference to FIG. 22.

Referring to FIG. 22, when receiving a signal (S2210), the PHY of the HE device determines whether the received signal is a WLAN frame (S2220). In some embodiments, the HE device may determine whether the received signal is the WLAN frame by determining whether an L-STF is detected in the received signal.

If the received signal is the WLAN frame, the PHY of the HE device sets a PHY-BACKOFF.indication primitive to a predetermined value, for example a busy state (S2230). If the received signal is not the WLAN frame, the PHY of the HE device sets to the PHY-BACKOFF.indication primitive to an idle state (S2250). That is, the PHY maintains the state of the PHY-BACKOFF.indication primitive without switching it from an original state (the idle state).

Next, the PHY of the HE device detects a field following an L-SIG (S2240). In one embodiment, when the received frame is a HE format frame, the HE device may detect a BSS color in a HE-SIG-A that is the field following the L-SIG. In another embodiment, when the received frame is a HE frame with a legacy format, the HE device may detect a BSS color in a service field of a data field that is the field following the L-SIG. In yet another embodiment, when the received frame is an HT format frame, the HE device may detect an HT-SIG that is the field following the L-SIG. When the received frame is a VHT format frame, the HE device may detect a VHT-SIG that is the field following the L-SIG.

When detecting the field following the L-SIG (2240), the PHY of the HE device switches the PHY-BACKOFF.indication primitive from the busy state to the idle state (S2250).

Since the PHY-BACKOFF.indication primitive is transferred from the PHY to a local MAC entity, a MAC layer of the HE device can determine whether to switch the backoff function to a backoff freeze state or to proceed with the backoff in accordance with the current state of the PHY-BACKOFF.indication primitive.

Next, a method for setting a state of a PHY-CCA.indication primitive by the PHY of the HE device is described with reference to FIG. 23.

Referring to FIG. 23, when receiving a signal (S2310), the PHY of the HE device determines whether the received signal is a WLAN frame (S2320). In some embodiments, the HE device may determine whether the received signal is the WLAN frame by determining whether an L-STF is detected in the received signal.

If the received signal is not the WLAN frame, the PHY of the HE device determines whether strength of the received signal is higher than a CCA threshold (S2330). If the strength of the received signal is lower than the CCA threshold, the PHY of the HE device sets the PHY-CCA.indication primitive to an idle state (S2390). That is, the PHY maintains the current state of the PHY-CCA.indication primitive in the idle state. Accordingly, the HE device can attempt a transmission. Since the received signal acts interference when the strength of the received signal is higher than the CCA threshold, the PHY of the HE device sets the PHY-CCA.indication primitive to a busy state (S2370).

If the received signal is the WLAN frame, the PHY of the HE device sets the PHY-CCA.indication primitive to the busy state (S2340). Next, the PHY of the HE device determines whether the received signal is a WLAN frame transmitted from an OBSS (S2350). In some embodiments, the HE device may detect a BSS color from a HE-SIG-A and determine whether the received signal is the frame transmitted from the OBSS, based on the BSS color.

If the received signal is not the frame transmitted from the OBSS (i.e., the received signal is a WLAN frame transmitted from its BSS), the PHY of the HE device continuously maintains the current state of the PHY-CCA.indication primitive in the busy state (S2370). Subsequently, when the received frame ends (S2380), the PHY of the HE device switches the PHY-CCA.indication primitive to the idle state (S2390).

If the received signal is the WLAN frame transmitted from the OBSS, the HE device determines whether the strength of the received signal is higher than a CCA threshold for the OBSS (S2360). If the signal strength of the frame received from the OBSS is higher than the CCA threshold (S2360), the PHY of the HE device continuously maintains the current state of the PHY-CCA.indication primitive in the busy state (S2370). Subsequently, when the received frame ends (S2380), the PHY of the HE device switches the PHY-CCA.indication primitive to the idle state (S2390). If the signal strength of the frame received from the OBSS is lower than the CCA threshold (S2360), the PHY of the HE device switches the PHY-CCA.indication primitive to the idle state without waiting until an end time of the frame (S2390).

Since the PHY-CCA.indication primitive is transferred from the PHY to a local MAC entity, a MAC layer of the HE device can determine whether to switch the backoff function to a backoff suspend state or to proceed with the backoff in accordance with the current state of the PHY-CCA.indication primitive.

Next, an operation in a MAC layer of the HE device is described with reference to FIG. 24.

Referring to FIG. 24, when a PHY-BACKOFF.indication primitive transferred from a PHY is a busy state (S2410), the MAC layer of the HE device sets a backoff function to a backoff freeze state (S2420).

If the PHY-BACKOFF.indication primitive is an idle state, the MAC layer determines a current state of a PHY-CCA.indication primitive transferred from the PHY (S2430). If the PHY-CCA.indication primitive is in an idle state when the PHY-BACKOFF.indication primitive is in the idle state, the MAC layer proceeds with backoff since a channel is not in use (S2460). The MAC layer may proceed with the backoff after an AIFS or DIFS period if the AIFS or DIFS period has not elapsed.

If the PHY-CCA.indication primitive is switched to the busy state when the PHY-BACKOFF.indication primitive is in the idle state, the MAC layer switches the backoff function to a backoff suspend state (S2440) and then checks whether the current state of the PHY-CCA.indication primitive is switched to the idle state (S2450). If the PHY-CCA.indication primitive is switched to the idle state, the MAC layer proceeds with the backoff (S2460). The MAC layer may proceed with the backoff without duration of a predetermined IFS period, for example the AIFS or DIFS period if the AIFS or DIFS period has elapsed. Alternatively, the MAC layer may proceed with the backoff after the AIFS or DIFS period if the AIFS or DIFS period has not elapsed.

The MAC layer may start a transmission (S2470) after proceeding with the backoff (S2460).

As such, the MAC layer of the HE device can control the backoff based on the primitives transferred from the PHY.

A transmission control method according to above embodiments may be executed by a baseband processor 10 shown in FIG. 1 to FIG. 3. In one embodiment, instructions for executing the transmission control method according to above embodiments may be stored in a non-transitory computer-readable recording medium such as a memory 40. In another embodiment, at least some of the instructions may be MAC software. In yet another embodiment, at least some of the instructions may be transmitted from a non-transitory computer-readable recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A transmission control method by a device belonging to a basic service set (BSS) in a wireless local area network (WLAN), the method comprising:
   receiving a frame, the frame including a field indicating a BSS color of the frame;
   determining the BSS color of the frame by decoding the field; and
   in response to a transmission condition being satisfied, the transmission condition including a first condition that the BSS color of the frame indicates a neighbor BSS of the BSS, attempting a transmission at a time between a time of decoding the field and an end time of the frame.

2. The method of claim 1, wherein the transmission condition further includes a second condition that a signal strength of the frame is higher than a predetermined clear channel assessment (CCA) threshold when the BSS color indicates the neighbor BSS.

3. The method of claim 1, further comprising setting a medium to a busy state from a detection time of the frame to the detection time of the BSS color, and setting, at a time between the time of decoding the field and the end time of the frame, the medium to an idle state when the transmission condition including the first condition is satisfied.

4. The method of claim 1,
   wherein attempting the transmission includes performing backoff after the field.

5. The method of claim 4, wherein performing the backoff includes waiting during a contention window without duration of a predetermined interframe space (IFS) period after the field.

6. The method of claim 4, wherein performing the backoff includes
   setting the contention window as a contention window according to the backoff minus a value corresponding to a time from a detection time of the frame to the detection time of the BSS color, and
   waiting during the set contention window.

7. The method of claim 1,
   wherein receiving the frame includes setting a first primitive to a first state at a detection time of the frame, and
   wherein attempting the transmission includes switching the first primitive from the first state to a second state after the field when the transmission condition is satisfied.

8. The method of claim 7, wherein receiving the frame further includes setting a second primitive to a first state at the detection time of the frame, and
   wherein the method further comprises switching the second primitive from the first state to a second state after the field.

9. The method of claim 8, wherein attempting the transmission further includes setting a backoff function to a backoff freeze state when the first primitive is in the first state and the second primitive is in the first state, and performing backoff when the first primitive is in the second state and the second primitive is in the second state, and
   wherein performing the backoff includes waiting during a contention window according to the backoff without duration of a predetermined IFS period.

10. The method of claim 1, wherein attempting the transmission includes controlling backoff based on a state of a first primitive that is determined based on the transmission condition and a state of a second primitive that is determined based on whether a first field following a legacy signal field is detected in the frame.

11. The method of claim 10, wherein receiving the frame includes setting the first primitive to a first state and the second primitive to a first state at a detection time of the frame, and
   wherein attempting the transmission includes maintaining the first primitive in the first state when the transmission condition is not satisfied and setting the second primitive to a second state when the first field is detected.

12. The method of claim 11, wherein the transmission condition further includes a second condition that signal strength of the frame is higher than a predetermined CCA threshold when the BSS color indicates the neighbor BSS.

13. The method of claim 11, wherein attempting the transmission includes switching the first primitive from the first state to a second state when the transmission condition is satisfied and setting the second primitive to a second state when the first field is detected.

14. The method of claim 10, wherein the second primitive is maintained in a predetermined state when the frame is not a WLAN signal.

15. A transmission control method by a device belonging to a basic service set (BSS) in a wireless local area network (WLAN), the method comprising:
   receiving a frame including a short training field, a long training field, a first signal field, and a second signal field following the first signal field, wherein the short training field, the long training field, and the first signal field support a legacy WLAN, and the second signal field includes a BSS color;
   setting a medium to a busy state in response to detecting the short training field in the frame;

detecting the BSS color using the second signal field; and switching, at a time between a time of detecting that the BSS color and an end time of the frame, the medium from the busy state to an idle state in response to a transmission condition being satisfied, the transmission condition including a first condition that the BSS color indicates the neighbor BSS of the BSS.

16. The method of claim 15, further comprising suspending backoff while the medium is in the busy state.

17. The method of claim 16, further comprising waiting during a contention window according to backoff after a predetermined interframe space (IFS) period when the medium is switched to the idle state.

18. The method of claim 17, further comprising attempting a transmission after the contention window.

19. The method of claim 15, wherein the transmission condition further includes a second condition that a signal strength of the frame is higher than a predetermined clear channel assessment (CCA) threshold when the BSS color indicates the neighbor BSS.

20. The method of claim 19, further comprising setting the medium to an idle state in a case that the signal strength of the frame is lower than the predetermined CCA threshold when the BSS color indicates the neighbor BSS.

* * * * *